3,219,668
ETHYNYLATED LACTAMS AND PROCESS FOR
THEIR PRODUCTION
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Aug. 27, 1963, Ser. No. 304,976
5 Claims. (Cl. 260—294.7)

This invention relates to substituted lactams. More particularly, this invention relates to certain ethynylated lactams having the formula:

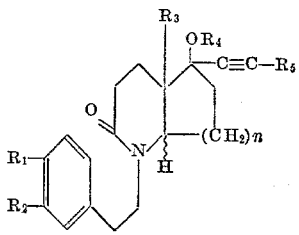

wherein $R_1$ and $R_2$ may be hydrogen, hydroxy or lower alkoxy such as methoxy, ethoxy, propoxy, and the like, $R_3$ may be hydrogen or lower alkyl such as methyl, ethyl, propyl, butyl, isobutyl and the like, $R_4$ may be hydrogen or an acyl radical such as acetyl, propionyl, benzoyl and the like, and $R_5$ may be hydrogen, halogen such as chlorine or bromine, lower alkoxy such as methoxy or ethoxy, or lower alkyl such as methyl, ethyl, propyl and the like or an aryl radical such as phenyl, benzyl and the like, and $n$ is an integer of 1 or 2. This invention also includes within its scope a novel process for the production of these lactams. The use of a wiggly line in the above formula denotes that the orientation of the hydrogen atom can be either cis or trans orientated with respect to $R_3$. On the other hand, the use of a dotted line denotes trans orientation and the use of a solid line denotes cis orientation.

The novel compounds of this invention are valuable intermediates for the production of certain 1-ethynyl substituted quinolizines such as those of the formula:

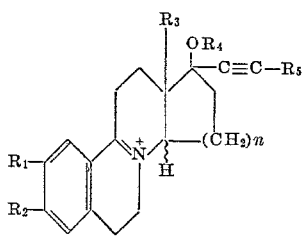

which can be readily obtained by ring closing the novel lactams of this invention by employing agents such as phosphorous oxychloride. These substituted quinolizines are, of course, related to the cyclopentanophenanthrenes and are important therapeutic agents useful in the treatment of circulatory collapse or endocrine disorders.

It has been found that the compounds of this invention may be obtained by adding acetylene or substituted acetylene to 1-keto-lactams of the formula:

The 1-keto-lactams used as starting materials for the preparation of the compounds of this invention are described and claimed in our copending application, Serial No. 248,872 filed January 2, 1963.

The reaction is carried out by first reacting acetylene or the selected substituted acetylene such as chloroacetylene or methoxyacetylene with an alkali or an alkaline earth metal to form the corresponding alkali or alkaline earth metal acetylide. Exemplary of metals which form the metal acetylides are lithium, sodium, potassium, magnesium and the like.

The next step involves the condensation between the keto-lactams and the alkali or alkaline earth metal acetylide in a suitable solvent. Suitable solvents for use in carrying out this condensation reaction are, for example, liquid ammonia or a lower alkyl amine such as dimethylamine or diethylamine, and aliphatic ethers such as ethyl ether and isopropyl ether, cyclic ethers such as dioxane and tetrahydrofuran, hydrocarbons such as petroleum ether, benzene or toluene and lower aliphatic alcohols such as t-butanol. The solvent of choice is tetrahydrofuran. The reaction may be carried out over a wide range of temperatures ranging from —78° C. to the temperature of the refluxing solvent but are preferably carried out at or near ambient temperature such as 20° to 30° C. The time required for the reaction varies according to the reactants employed, and a reaction period of about 2 hours at ambient temperature is usually sufficient. The reaction mixture is then hydrolyzed and the reaction product formed is extracted from the mixture by solvents such as ethyl ether. Further purification may be effected by recrystallization or chromatographic techniques.

The final reaction product obtained in accordance with the foregoing sequence of reactions corresponds to those lactams wherein the substituent $R_4$ is hydrogen. Conversion of such products to those in which $R_4$ is acyl may be accomplished by acylation procedures such as, for example, by reacting this lactam with an acid anhydride such as acetic anhydride or an acid chloride such as acetyl chloride and the like.

In order to further illustrate this invention, the following examples are included. All temperatures are given in degrees centigrade.

*Example 1.*—*Cis - octahydro - 1-(m-methoxyphenethyl)-
4a - methyl - 5 - hydroxy - 5 - ethynyl - 2H - 1 - pyridine-2-one of the formula*

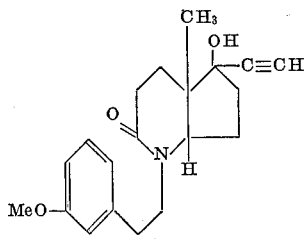

100 ml. of liquid ammonia is saturated with acetylene. There is then added 1.6 g. of potassium in small pieces followed by 100 ml. of ether to give a clear solution. To this is added dropwise a soltuion of 3.0 g. of cis-tetrahydro - 1 - (m - methoxyphenethyl) - 4a - methyl - 1H - 1-pyridine-2,5(3H,6H)-dione of the formula:

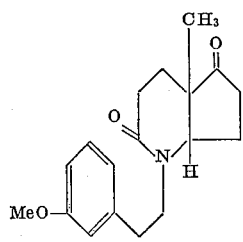

in 100 ml. of ether. The yellow solution is allowed to reflux for 5 hours, then stirred while the ammonia is allowed to evaporate. The mixture is partitioned between water and ether. The ether layer is dried and the ether removed by evaporation to leave 1.8 g. of yellow oil. This oil is place on 200 g. of alumina, and the column is eluted with a 3% solution of ethanol in ether to give cis-octahydro - 1 - (m - methoxyphenethyl) - 4a - methyl - 5-hydroxy-5-ethynyl-2H-1-pyrindine-2-one as white crystals, M.P. 128°–129°. The product may be recrystallized from a mixture of ethyl acetate and petroleum ether.

*Example 2.*—*Cis - octahydro - 1 - (m - methoxyphenethyl) - 4a - methyl - 5 - hydroxy - 5 - ethynyl - 2H - 1-pyrindine-2-one*

A solution of ethyl magnesium bromide is prepared from 16.5 g. of magnesium, 80 g. of ethyl bromide and 1.5 liters of tetrahydrofuran. Acetylene is passed into this solution for 3 hours to give a cloudy solution. A solution of 19 g. of cis-tetrahydro-1-(m-methoxyphenethyl)-4a-methyl-1H-1-pyrindine - 2,5,(3H,6H) - dione in 250 ml. tetrahydrofuran is added over a 10 minute period. The mixture is then stirred for ½ hour at 25°. The reaction is decomposed by addition of a saturated solution of ammonium chloride, and the tetrahydrofuran is removed by distillation. The residue is partitioned between water and ether, and the ether layer is dried and concentrated to an oil. The oil is recrystallized from a mixture of ethyl acetate and petroleum ether to give cis-octahydro - 1 - (m - methoxyphenethyl) - 4a - methyl - 5 - hydroxy-5-ethynyl-2H-1-pyrindine-2-one as white crystals, M.P. 127°–129°.

*Example 3.*—*Trans - octahydro - 1 - (m - methoxyphenethyl) - 4a - methyl - 5 - hydroxy - 5 - ethynyl - 2H - 1-pyrindine-2-one*

In the same way as described in Example 2, 3.0 g. of trans - tetrahydro - 1 - (m - methoxyphenethyl) - 4a-methyl-1H-1-pyrindine-2,5(3H,6H)-dione gives trans-octahydro - 1 - (m - methoxyphenethyl) - 4a - methyl - 5 - hydroxy-5-ethynyl-2H-1-pyrindine-2-one as white crystals, M.P. 142°–143° after recrystallization from ethyl acetate.

*Example 4.*—*Cis - octahydro - 1 - (m - hydroxyphenethyl) - 4a - methyl - 5 - hydroxy - 5 - ethynyl - 2H - 1-pyrindine-2-one*

A solution of ethyl magnesium bromide is prepared from 4.8 gr. of magnesium, 24 gr. of ethyl bromide and 500 ml. of freshly distilled tetrahydrofuran. Acetylene is passed into this solution for 2 hours. A solution of 5.8 gr. of cis - tetrahydro - 1-(m-hydroxyphenethyl)-4a-methyl-1H-1-pyrindine-2,5(3H,6H)-dione in 200 ml. tetrahydrofuran is added over a 20 minute period. The mixture is stirred for 2 hours at ambient temperature. The reaction is decomposed by addition of a saturated solution of ammonium chloride, and the tetrahydrofuran removed by distillation. The residue is taken up in 250 ml. of a 10% solution of ethanol in acetic acid, and a solution of 5 gr. of Girard's Reagent T in 50 ml. of 10% aqueous ethanol is added. The mixture is refluxed for 4 hours, concentrated to dryness and the residue is taken up in 100 ml. of water. Girard's Reagent T which is essentially trimethylaminoaceto hydrazide chloride combines with unreacted ketonic lactams to form the corresponding water soluble hydrazones, while the desired nonketonic lactams being insoluble in water are extracted with methylene chloride. The methylene chloride extract is dried over magnesium sulfate and the solvent removed by distillation to give cis-octahydro-1-(m-hydroxyphenethyl)-4a-methyl-5-hydroxy-5-ethynyl-2H-1-pyrindine - 2 - one as a white solid. The product, after recrystallization from a mixture of ethyl acetate and petroleum ether, melts at 152°–153°.

It is to be understood that the foregoing detailed description is given merely by way of illustration and that many variations may be made therein without departing from the spirit of our invention.

Having described our invention, what we desire to secure by Letters Patent is

1. A compound selected from the group consisting of those having the formula:

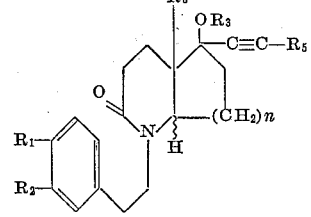

wherein $R_1$ and $R_2$ is each a member of the group consisting of hydrogen, hydroxy and lower alkoxy, $R_3$ is a member of the group consisting of hydrogen and lower alkyl, $R_4$ is a member selected from the group consisting of hydrogen acetyl, propionyl, and benzoyl and $R_5$ is a member of the group consisting of hydrogen, halogen, lower alkoxy, phenyl, benzyl and lower alkyl and $n$ is an integer of from 1 to 2.

2. Cis-octahydro - 1 - (m - methoxyphenethyl) - 4a-methyl-5-hydroxy-5-ethynyl-2H-1-pyrindine-2-one.

3. Trans-octahydro - 1 - (m - methoxyphenethyl) - 4a-methyl-5-hydroxy-5-ethynyl-2H-1-pyrindine-2-one.

4. Cis - octahydro - 1 - (m - hydroxyphenethyl) - 4a-methyl-5-hydroxy-5-ethynyl-2H-1-pyrindine-2-one.

5. Process for the production of a compound having the formua:

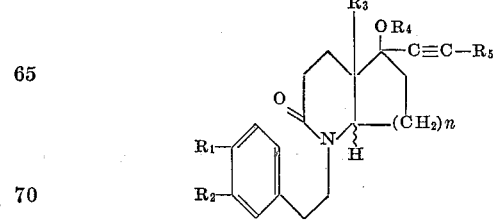

wherein $R_1$ and $R_2$ is each a member of the group consisting of hydrogen, hydroxy and lower alkoxy, $R_3$ is a member of the group consisting of hydrogen and lower alkyl, $R_4$ is hydrogen and $R_5$ is a member of the group consisting of hydrogen, phenyl, benzyl, halogen, lower alkoxy and lower alkyl and $n$ is an integer of from 1 to 2 which comprises reacting a compound of the formula:

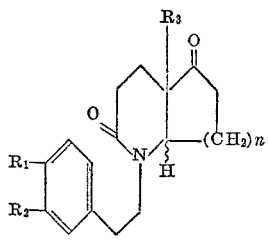

with a compound of the formula $R_5—C\equiv C—M$ in which M is a metal selected from the group consisting of alkali and alkaline earth metals in an inert solvent system followed by hydrolysis.

References Cited by the Examiner
UNITED STATES PATENTS

| | | | |
|---|---|---|---|
| 3,073,847 | 1/1963 | Doebel et al. | 260—328 |
| 3,094,528 | 6/1963 | Davis | 260—294.3 X |
| 3,126,411 | 3/1964 | Rey-Bellet et al. | 260—328 X |

OTHER REFERENCES

Fieser et al., Advanced Organic Chemistry, page 374, Reinhold Pub. Co. (1961).

WALTER A. MODANCE, *Primary Examiner.*

NICHOLAS S. RIZZO, *Examiner.*